United States Patent
Staser

(10) Patent No.: US 6,564,525 B1
(45) Date of Patent: May 20, 2003

(54) ROLL FORMED HARDWARE MODULE

(75) Inventor: Brian Hale Staser, Troy, MI (US)

(73) Assignee: Delphi Technologies, Inc., Troy, MI (US)

( * ) Notice: Subject to any disclaimer, the term of this patent is extended or adjusted under 35 U.S.C. 154(b) by 78 days.

(21) Appl. No.: 09/644,619

(22) Filed: Aug. 23, 2000

(51) Int. Cl.⁷ ................................................ E04L 3/30
(52) U.S. Cl. ..................... 52/735.1; 52/731.1; 296/188; 296/191; 296/202; 296/203.03; 296/146.6
(58) Field of Search ................................. 296/188, 191, 296/202, 203.01, 203.03, 37.3, 152, 153, 146.5–146.6, 146.7, 146.9; 52/735.1, 731.1

(56) References Cited

U.S. PATENT DOCUMENTS

| | | | | |
|---|---|---|---|---|
| 4,766,025 A | * | 8/1988 | Sanok et al. ................. 428/159 |
| 4,923,539 A | * | 5/1990 | Spengler et al. ............... 156/79 |
| 5,073,318 A | * | 12/1991 | Rohrlach et al. ........... 264/46.5 |
| 5,224,299 A | * | 7/1993 | Abe ............................. 49/502 |
| 5,236,534 A | * | 8/1993 | Noguti et al. ................ 156/245 |
| 5,536,060 A | * | 7/1996 | Rashid et al. ............. 296/146.6 |
| 5,571,355 A | * | 11/1996 | Kornylo ....................... 156/78 |
| 5,626,382 A | * | 5/1997 | Johnson et al. .......... 296/146.7 |
| 5,640,869 A | | 6/1997 | Takeda et al. |
| 5,743,588 A | | 4/1998 | Ufrecht |
| 5,813,719 A | | 9/1998 | Kowalski et al. |
| 5,924,760 A | * | 7/1999 | Krajewski et al. ........ 296/146.6 |
| 5,932,331 A | * | 8/1999 | Jones et al. ................. 428/218 |
| 5,962,089 A | * | 10/1999 | Jones et al. .................... 428/31 |
| 6,016,630 A | | 1/2000 | Takeda et al. |

* cited by examiner

Primary Examiner—Carl D. Friedman
Assistant Examiner—Yvonne M. Horton
(74) Attorney, Agent, or Firm—Kathryn A. Marra

(57) ABSTRACT

A vehicle door panel and method for roll forming the vehicle door panel are provided. The vehicle door panel has an exterior side and an interior side including a number of longitudinal protrusions formed during the roll forming process. The predetermined number of longitudinal protrusions extends inward from the interior side and receives door hardware components. The door hardware components are installed onto the vehicle door panel forming a vehicle door module. The vehicle door module is then attached to the vehicle door.

23 Claims, 4 Drawing Sheets

ROLL FORMED HARDWARE MODULE

TECHNICAL FIELD

The present invention relates generally to a door structure for a vehicle and, more particularly, to a vehicle door structural hardware module.

BACKGROUND OF THE INVENTION

It is customary in the design and manufacture of vehicles to incorporate many parts into subassemblies to increase manufacturability. These subassemblies, commonly called modules, include a number of interrelated parts that can be assembled quickly and easily and then subsequently incorporated into the final assembly of a vehicle. Many of the modules concern structural portions of the vehicle and it is important in the design of these structural modules to provide the requisite structural stiffness and integrity while simultaneously ensuring the benefits of a modular design.

One such structural module is a structural module within a vehicle door. Door modules include wiring harnesses, an inside handle and latch system, a window regulator mechanism as well as other components. Functional and reliability tests are performed on the module and its components prior to installation into a door frame to facilitate testing and trouble shooting. Once testing is complete, the module is loaded into a doorframe from the inboard side.

Typically, the hardware module for a vehicle door system is manufactured of steel formed in a steel stamping process. In a steel stamping process, rolled steel stock is cut to the appropriate size based on the finished panel size desired and then processed through a number of tool dies. When the process is complete, the various hardware components are hung on the door panel forming a door module. Thus, the door module comprises the door panel along with the various hardware components. The door module is then installed in the vehicle door.

Water management features are required to ensure that the interior passenger side of the door is kept dry. Typically, a plastic sheet is placed over the holes in the interior side of the module. This sheet can be difficult to install and its reliability as a water barrier is low. The hardware module is attached to the interior portion of the vehicle door by the use of a suitable fastening means such as bolts before the sheet is installed.

It is therefore desirable to provide a hardware module that is lower in production costs as compared to a module fabricated by conventional steel stampings while maintaining the functional strength and performance of the panel and increased ease of manufacturability.

SUMMARY OF THE INVENTION

Advantageously, the present invention provides for a vehicle door panel that is manufactured using a roll forming process. The roll formed panel has an exterior side and an interior side including a number of longitudinal protrusions formed during the roll forming process. The predetermined numbers of protrusions extend outward from the interior side and receive door hardware components that are installed and assembled onto the roll formed panel to make the door module. The door module is then attached to the vehicle door.

In accordance with the preferred embodiment of the present invention, there is a significant manufacturing cost savings and increased ease of manufacturability achieved through the reduction of post-processing operations. Manufacturing time to produce the roll formed panel is also much less than that of a stamped panel that is a multi-step process. The roll formed panel also carries the hardware components associated with a vehicle door while simultaneously providing for a sealing bead thus permitting the panel to act as a water vapor barrier thereby protecting the interior passenger compartment. Therefore, a roll formed panel produces the lowest cost possible for a panel formed from a steel plate while providing increased door structure by increasing the frontal load carrying capacity of the door and incorporating a wet dry water management system integral with the panel.

BRIEF DESCRIPTION OF THE DRAWINGS

Referring now to the drawings.

DETAILED DESCRIPTION OF THE PREFERRED EMBODIMENT

Figure 1:
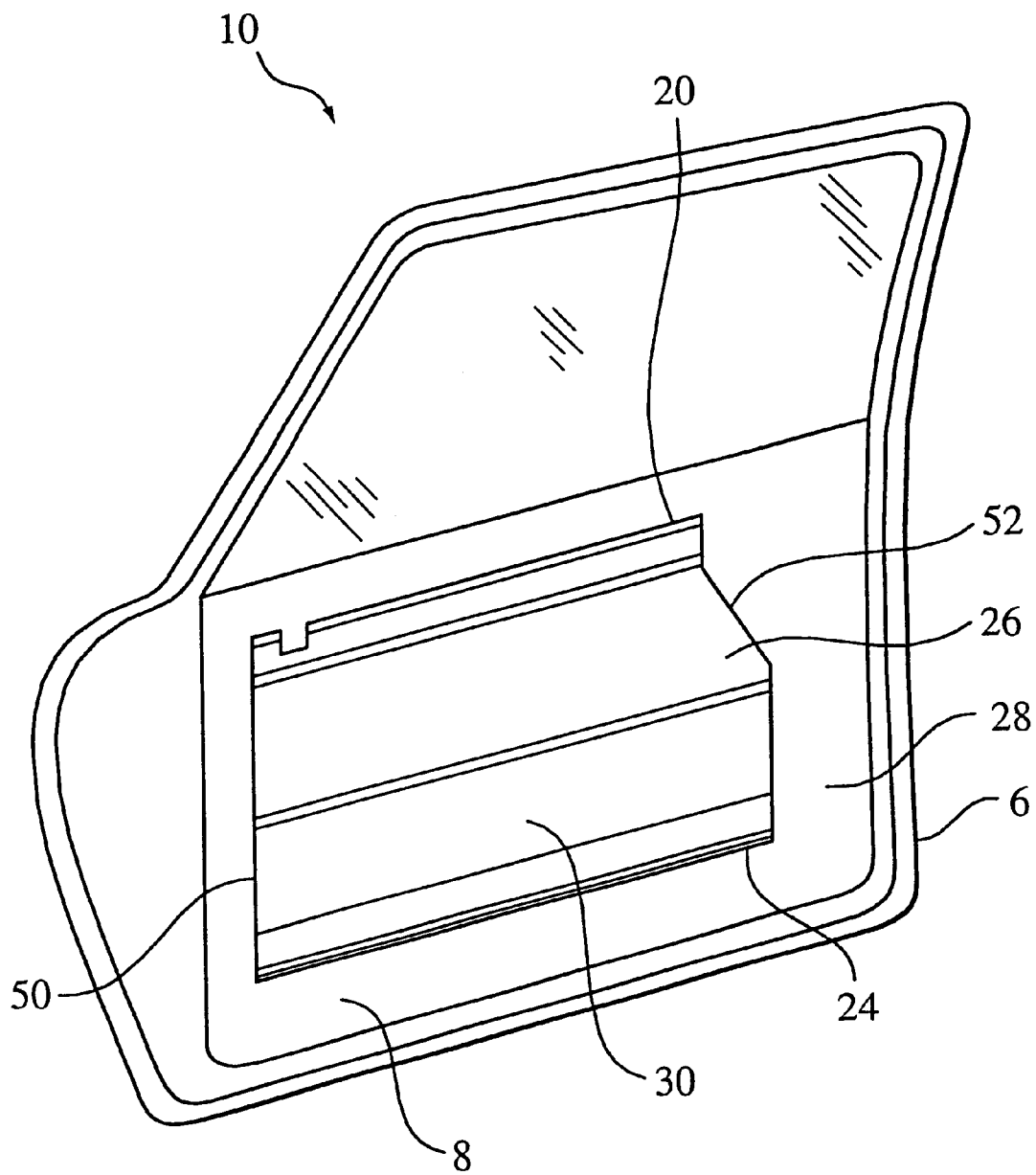
FIG. 1 is an isometric view of a vehicle door assembly showing the installation of a roll formed vehicle door module.

Referring to FIG. 1, a vehicle door 10 is shown with an inner panel 8 and an outer panel 6. The hardware module is comprised of a roll formed panel (panel) 28 having a first end 50, a second end 52, a first longitudinal edge 20, a second longitudinal edge 24 and a longitudinal extending central portion 26 including an interior side 30 which faces the interior of the compartment of the vehicle. The panel 28 is mounted to the inner panel 8 of the vehicle door (door) 10 using mechanical fasteners. The panel 28 provides additional structure to give structural integrity to the door 10. Various hardware components are attached to the panel 28.

Figure 2:
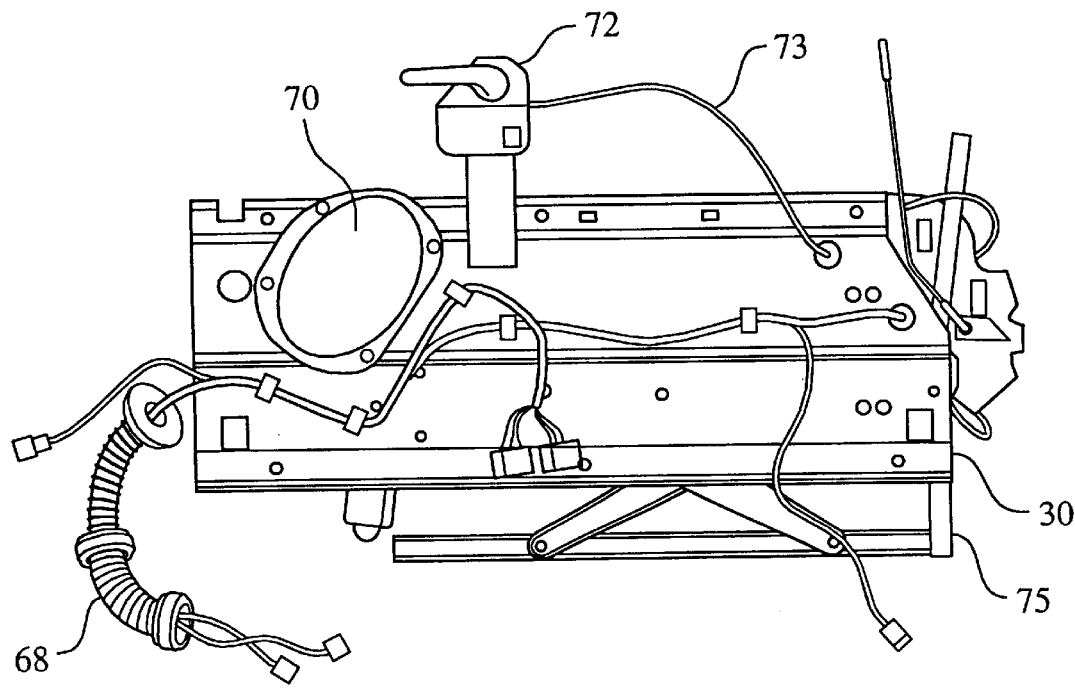
FIG. 2 is an interior perspective view of a roll formed vehicle door module with hardware components.

Referring to FIG. 2, the interior side 30 of the panel 28 is shown. A wiring harness 68, including a sealing grommet, is shown attached to the panel 28. A speaker 70 and an inside door handle assembly 72 are shown attached to the panel 28. An inside handle cable 73 of the inside door handle assembly 72 is also shown and extends from the inside handle assembly 72 to the interior side 30. A rear glass run channel 75 is also shown.

Figure 3:
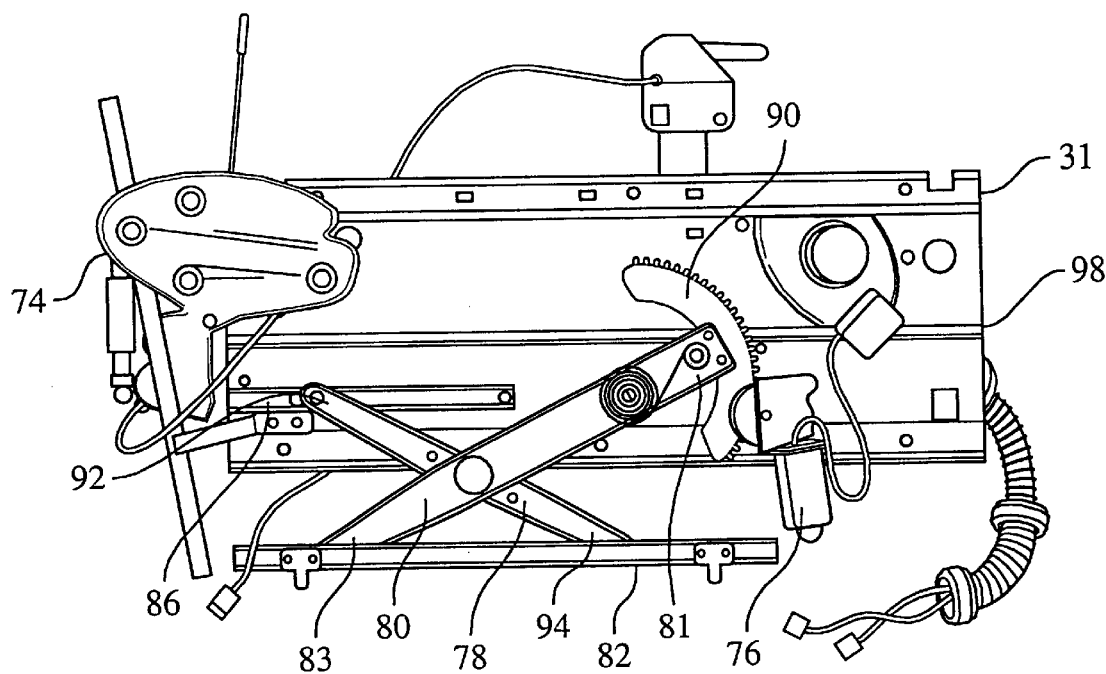
FIG. 3 is an exterior perspective view of a roll formed vehicle door module with hardware components.

Referring to FIG. 3, the panel 28 has an exterior side 31 that faces the outer panel 6 (FIG. 1). An outside handle and key cylinder assembly 74 is mounted onto the panel 28 for positioning on the outer panel 6 (FIG. 1) when the door 10 is assembled. A motor 76 is mounted on the exterior side 31 and provides the power to lift and lower the window glass. If the motor 76 were mounted on the interior side 30, a housing would be required to keep the sector gear from riding off the pinion. However, the motor 76 and the sector gear 90 are mounted on the exterior side 31 and there is no need for a separate housing.

A window regulator mechanism 78 is shown disposed in the vehicle. The window regulator mechanism 78 is powered by the motor 76 and provides window adjustment and control and is shown disposed in the door 10. The window regulator mechanism 78 can be any of a number of conventional systems but preferable is an X-arm type that can be mechanically fastened directly to the panel 28.

The window regulator mechanism 78 comprises a lift arm 80 having a first end 81 and an opposing second end 83, where the first end 81 is pivotally mounted to a sector gear 90 and the second end 83 is slidably mounted to a first channel member 82. The sector gear 90 is driven by a pinion and provides the mechanism by which the window glass is lifted and lowered. As is known in the art, the first channel member 82 is intended to engage the windowpane and is typically mounted to a lower portion of the windowpane. A balancing arm 79 pivotally connects the lift arm 80 at a point that preferably comprises a midpoint of the lift arm 80. The balancing arm 79 has a first end 92 and an opposing second end 94, where the first end 92 is slidably connected to a second channel member 86 mounted onto the panel 28 (FIG. 1). The second end 94 of the balancing arm 79 is slidably mounted to the first channel member 82.

Figure 4:
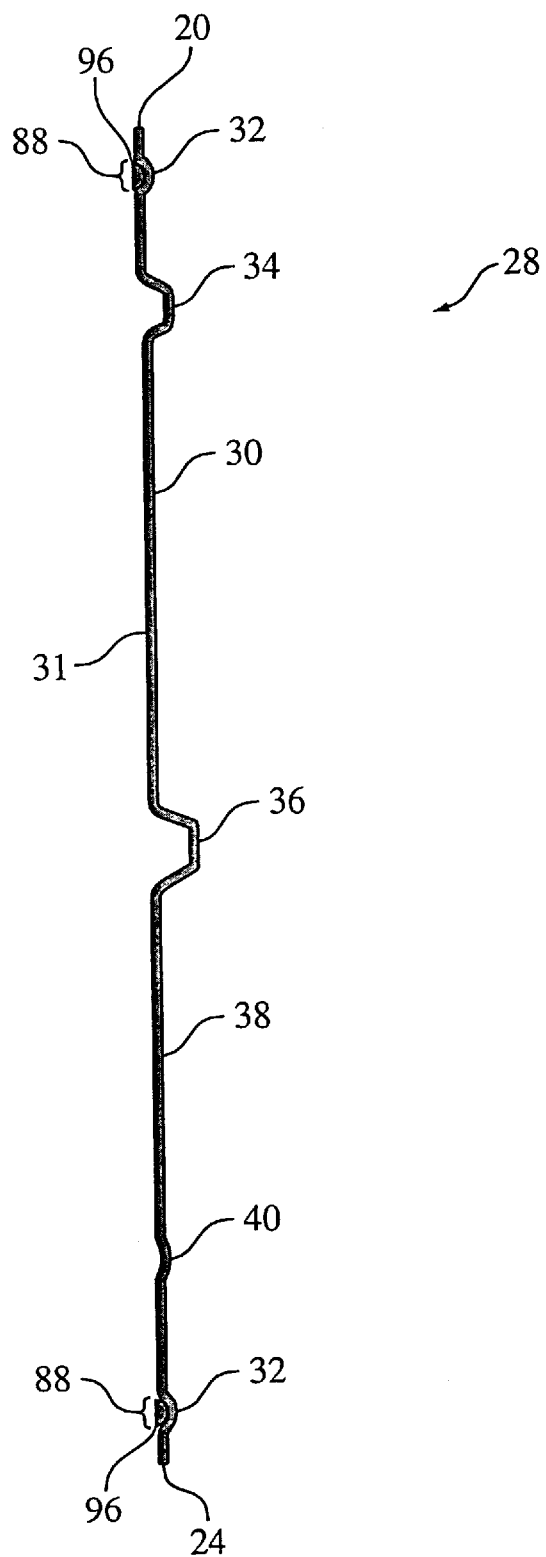
FIG. 4 is a cross section view of the roll formed panel.

Referring to FIG. 4, a cross section of the panel 28 is shown without the attachment of any hardware components. The cross section of the panel 28 is longitudinally uniform throughout. The panel 28 has multiple longitudinal protrusions 32, 34, 36 that are formed during the roll-forming process and extend outward along the surface of the interior side 30. Longitudinal protrusions 32 are preferably semi-circular in shape and are formed proximate to first longitudinal edge 20 and the second longitudinal edge 24. Longitudinal protrusion 34 preferably is three-sided and is located proximate to the longitudinal protrusion 32. Longitudinal protrusion 36 is preferably three-sided and is generally located along the center of panel 28. A longitudinal bend (bent portion) 40 is located proximate to the longitudinal protrusion 32 located proximate to the second longitudinal edge 24. The longitudinal protrusions 32, 34, 36 formed in the panel 28 increase the cross sectional moment of inertia of the panel and consequently, add structural rigidity and strength to the panel.

It is noted that the size, shape, location and number of the protrusions will vary with the space available within the door 10 as well as the hardware components carried by the door 10. A vertical portion 38 located between protrusion 36 and bend 40 is angled outward to accommodate attachment of the window regulator mechanism 78. The angle will vary depending on the type of window regulator mechanism 78 employed as well as the size and shape of the door 10 (FIG. 1).

Referring to FIGS. 1, 2 3 and 4, it is also desirable to provide separate "wet" and "dry" areas within the door 10 to segregate the components that do not tolerate water vapor from those that do. For example, electrical controls for power windows and locks (not shown), the wiring harness 68, the speaker 70, inside handle assembly 72 are located inside the vapor barrier thus preventing exposure to water vapor.

The panel 28 is provided with an area adapted to contain the 'dry' components of the hardware. The preferred sealing method is a sealing member 96, and most preferably, a sealing bead, although other suitable sealing means may be employed. Sealing bead 96, comprised of closed cell foam, is placed inside cavities 88 of longitudinal protrusions 32 and continues along the first end 50 and second end 52 of the panel 28. Thus, a continuous seal is formed around the periphery 98 of the panel 28 where it interfaces with the inner panel 8 of the door 10. The sealing bead creates a water vapor barrier that eliminates the need for a separate plastic or foam water barrier. The sealing member 96 provides a dry area on the interior side 30 of the panel 28 that is free from exposure to water vapor. Advantageously, the panel 28 functions simultaneously as the carrier of the various hardware components and the water vapor barrier.

Figure 5:
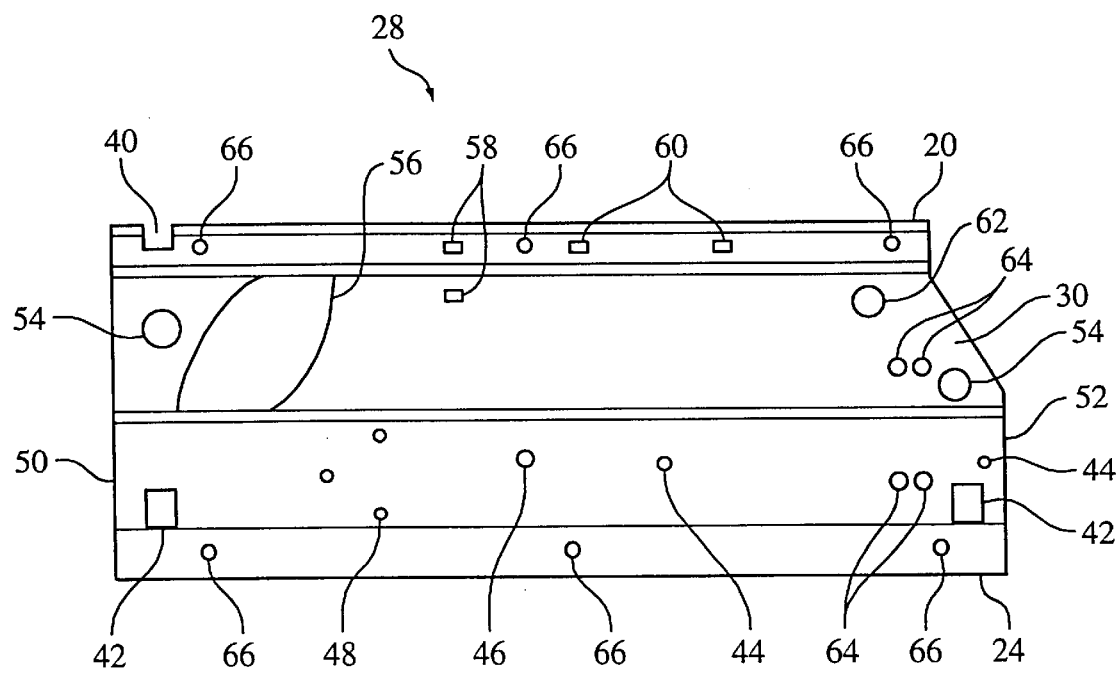
FIG. 5 is a side view of the vehicle door module without hardware components.

Referring to FIGS. 2 and 5, the interior side 30 of the panel 28 having first end 50 and second end 52 is shown without the attachment of any hardware components. A three-sided cutout 40 is located along the first longitudinal edge 20. Two four-sided apertures 42 are located proximate second longitudinal edge 24 and generally proximate first end 50 and second end 52. The trim panel hooks (not shown) are placed into the cutouts 40 and apertures 42 thus attaching the trim panel (not shown) to the door 10. Two apertures 44 are located in the door 10 to attach to the channel member 86 of the window regulator mechanism 78. An aperture 46 is generally centrally located and accepts a stud or other similar fastening means in order to attach the window regulator mechanism 78 to the panel 28. Apertures 48 receive attachment hardware for connecting the motor 76 to the panel 28.

Referring to FIGS. 2 and 5, two apertures 54 are located within the panel 28. One aperture 54 is located proximate to the first end 50. The second aperture 54 is located proximate to the second end 52. Apertures 54 are provided to allow the wiring harness 68 to pass between the interior side 30 (FIG. 4) and the exterior side 31 (FIG. 3). An aperture 56 is located within the panel 28 and positions the speaker 70 within the panel 28. Two four-sided slots 58 are located proximate the first longitudinal edge 20 and position the inside door handle assembly 72. Two four-sided slots 60 are located proximate to the first longitudinal edge 20 and receive mechanical fasteners to attach the trim panel (not shown) onto the interior side 30 of the panel 28. An aperture 62 is located proximate the first longitudinal edge 20 and the second end 52 for insertion of the inside handle cable 73 for providing access to the outside handle and key cylinder assembly 74. Four apertures 64 are located proximate the second end 52 and position the rear glass run channel 75. Three apertures 66 are located along the first longitudinal edge 20 and three apertures 66 are located along the second longitudinal edge 24. Apertures 66 accept mechanical fasteners for attachment of the panel 28 to the inner panel 8 (FIG. 1) of the door 10 (FIG. 1).

Thus, the panel 28 is installed into the interior of the door 10 and fastened therein. Hardware components are attached to the panel 28 in predetermined locations using slots 58, 60, cutout 40 and apertures 42, 44, 46, 48, 54, 56, 62, 64, 66 and mechanical fasteners. The apertures 42, 44, 48, 54, 64, 66, cutout 40 and slots 58, 60 are manufactured in the steel stock using a steel stamping process either prior to the roll forming process or intermediate with the roll forming process. Post-processing machining operations are not required. The punching press operation is conventional and any number of techniques may be used. It should be noted that the desired longitudinal protrusions 32, 34, 36, recesses 88, longitudinal bend 40, vertical portion 38, apertures 42, 44, 46, 48, 54, 56, 62, 64, 66, slots 58, 60 and cutout 40 located within the panel vary in size and placement depending on the type of door 10 (FIG. 1) in which the panel 28 is assembled as well as the hardware components used.

Figure 6:
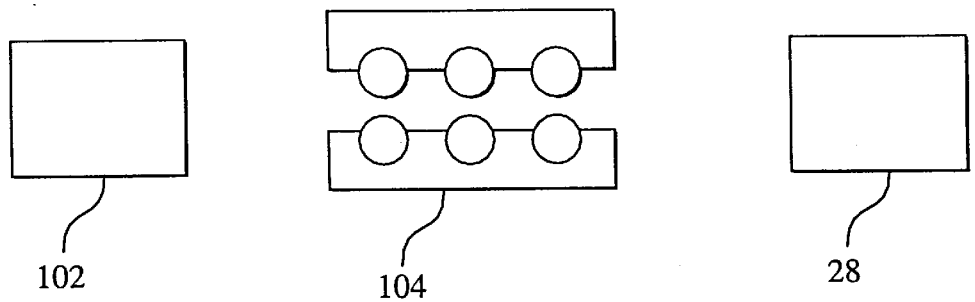
FIG. 6 is a schematic view of the roll forming process.

Referring to FIGS. 1, 4 and 6, panel 28 is made using a continuous roll forming process. The manufacture of panel 28 for a vehicle door module by a roll forming process starts with a length of flat stock 102. This flat stock 102 can be of any material that can be roll formed that is suitable for a door 10. For example, the flat stock 102 can be made of steel or steel alloys. The flat stock 102 is provided in coils and can be cut to any convenient length after the roll forming process. Before or prior to the roll forming process, the flat stock 102 is punched in order to create the apertures 42, 44, 48, 54, 64, 66, cutout 40 and slots 58, 60 required to mount the various hardware components to the door module.

The panel 28 is produced by feeding the rolled stock 102 through a series of rolls 104 to gradually change the shape of the metal as it passes through the rolls 104. Thus, the desired longitudinal protrusions 32, 34, 36, recesses 88, longitudinal bend 40 and vertical portion 38 are formed. The roll forming process is used to change the shape of the coiled metal stock into desired contours without altering the cross-sectional area. The panel 28 will have increased longitudinal strength as compared to a similar panel formed using a conventional steel stamping process.

Advantageously, panel 28 is formed as a single integral unit at the mill from a continuous section of steel. Thus, the use of multiple dies and post-processing operations (e.g. machining) is eliminated thereby greatly decreasing the costs while increasing the ease of manufacturability. The panel 28 also provides additional structure to give integrity to the construction of the door 10. Roll forming is advantageous over steel stamping because production speed is greater than other production methods. Further, end-unit assembly cost is reduced without compromising quality as compared to conventional steel stampings. Panel 28 maintains the structural integrity and rigidity of prior art vehicle doors as it is fabricated using a rolled beam process.

The present invention thus reduces cost and increases ease of manufacturability by producing a panel for attaching door hardware by a roll forming process as opposed to a panel formed by a conventional steel stamping process. The panel 28 also carries the hardware components associated with a door 10 while simultaneously providing for a sealing bead. Thus, the panel 28 acts as a water vapor barrier thereby protecting the interior passenger compartment while eliminating the need for a separately installed water barrier. A panel 28 also reduces post-processing operations required on a panel produced by a stamping process. Manufacturing time to produce the panel is also much less than that of a stamped panel that is a multi-step process. Thus, cost to produce the panel 28 is reduced. Therefore, the panel 28 produces the lowest cost possible for a panel formed from a steel plate while providing increased strength of the door structure. The panel 28 also incorporates a wet-dry water management system integral with the panel 28.

Referring to FIG. 4, it should be noted that it is within the scope of this invention that longitudinal protrusions 32, 34, 36, 40 may individually and selectively extend inward or extend outward toward the exterior of the door 10 depending on the hardware components to be installed onto the panel 28.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A panel for a vehicle door module, the panel comprising:

a body formed by a roll forming process, the body having an interior side and an opposing exterior side, the body including a predetermined number of longitudinal protrusions formed during the roll forming process, the predetermined number of longitudinal protrusions extending inwardly from the interior side, the panel being shaped for reception in and attachment to the vehicle door;

the body includes a first edge and an opposing second edge, wherein a first arcuate longitudinal protrusion and a second arcuate longitudinal protrusion are formed in the body, the first arcuate longitudinal protrusion being formed proximate the first edge, the second arcuate longitudinal protrusion being formed proximate the second edge;

the body includes a second three-sided longitudinal protrusion, the second three-sided longitudinal protrusion being formed between the first and second arcuate longitudinal protrusions; and the body includes a bent portion formed between the second three-sided longitudinal protrusion and the second arcuate longitudinal protrusion.

2. The panel as set forth in claim 1, wherein the body includes a first three-sided longitudinal protrusion, the first three-sided longitudinal protrusion being formed between the first and second arcuate longitudinal protrusions.

3. The panel as set forth in claim 1, wherein the first and second arcuate longitudinal protrusions define recesses formed in the exterior side of the body.

4. A panel for a vehicle door module, the panel comprising:

a body formed by a roll forming process, the body having an interior side and an opposing exterior side, the body including a predetermined number of longitudinal protrusions formed during the roll forming process, the predetermined number of longitudinal protrusions extending inwardly from the interior side, the panel being shaped for reception in and attachment to the vehicle door;

the body includes a first edge and an opposing second edge, wherein a first arcuate longitudinal protrusion and a second arcuate longitudinal protrusion are formed in the body, the first arcuate longitudinal protrusion being formed proximate the first edge, the second arcuate longitudinal protrusion being formed proximate the second edge;

the first and second arcuate longitudinal protrusions define recesses formed in the exterior side of the body; and a sealing member for partitioning the body into a first area defined by the body the sealing member and an outer panel of the vehicle door module, the sealing member being disposed within the recesses formed in the exterior side.

5. The panel as set forth in claim 4, wherein the first area comprises a dry area which is free from exposure to water vapor.

6. The panel as set forth in claim 4, wherein the body includes a periphery, the sealing member forming a continuous seal around the periphery of the body.

7. A method for forming a panel for a vehicle door module, the method comprising:

providing stock material; and passing the stock material between a series of rollers to successively change the shape of the stock material into a panel having an interior side and an opposing exterior side, the panel including a predetermined number of longitudinal protrusions formed during the roll forming process, the predetermined number of longitudinal protrusions extending inwardly from the interior side, the panel being shaped for reception in and attachment to the vehicle door.

8. The method as set forth in claim 7, wherein the stock material comprises coiled metal stock.

9. The method as set forth in claim 7, wherein passing the stock material comprises:

forming a first arcuate longitudinal protrusion in the panel body, the first arcuate longitudinal protrusion being formed proximate a first edge of the panel.

10. The method as set forth in claim 9, wherein passing the stock material comprises:

forming a second arcuate longitudinal protrusion in the panel, the second arcuate longitudinal protrusion being formed proximate a second edge of the panel.

11. The method as set forth in claim 10, wherein passing the stock material comprises:

forming a first three-sided longitudinal protrusion, the first three-sided longitudinal protrusion being formed between the first and second arcuate longitudinal protrusions.

12. The method as set forth in claim 10 wherein passing the stock material comprises:

forming a second three-sided longitudinal protrusion, the second three-sided longitudinal protrusion being formed between the first and second arcuate longitudinal protrusions.

13. The method as set forth in claim 10, wherein the first and second arcuate longitudinal protrusions define recesses formed in the exterior side of the panel.

14. The method as set forth in claim 13, further including:

providing a sealing member for partitioning the panel into a first area defined between the sealing member, the sealing member being disposed within the recesses formed in the exterior side.

15. The method as set forth in claim 14, wherein the first area comprises a dry area which is free from exposure to water vapor.

16. A vehicle door module, comprising:

a first panel having an interior side, an opposing exterior side, a first edge, and an opposing second edge, said first panel being formed by a roll forming process;

a first longitudinal protrusion formed in said first panel extending inwardly from said interior side, said first longitudinal protrusion being formed proximate said first edge and defining a first cavity;

a second longitudinal protrusion formed in said first panel extending inwardly from said interior side, said second longitudinal protrusion being formed proximate the second edge and defining a second cavity, said first and second longitudinal protrusions being formed during said roll forming process; and a second longitudinal protrusion formed in said first panel extending inwardly from said interior side, said second longitudinal protrusion being formed proximate the second edge and defining a second cavity, said first and second longitudinal protrusions being formed during said roll forming process; and a sealing member being disposed within said first and second cavities, said sealing member forming a continuous seal at a periphery of said first panel when said first panel is interfaced with an outer panel of a vehicle door, said continuous seal defining a dry area between said first panel and said outer panel.

17. The module as in claim 16, wherein said fist and second cavities are semi-circular in shape.

18. The module as in claim 16, wherein said first panel further comprises:

a third longitudinal protrusion formed in said first panel extending inwardly from said interior side, said third longitudinal protrusion being formed during said roll forming process and being formed intermediate said first and second edges; and a portion of said first panel defined between said third longitudinal protrusion and said second longitudinal protrusion, said portion being angled outward from said exterior side to accommodate attachment of a window regulator mechanism to said portion.

19. The module as in claim 18, wherein said first, second, and third longitudinal protrusions increase a cross sectional moment of inertia of said first panel.

20. The module as in claim 18, wherein said third longitudinal protrusion is a three-sided protrusion.

21. The module as in claim 16, wherein said sealing member comprises closed cell foam.

22. The module as in claim 21, further comprising:

a plurality of door components secured to said first panel in said dry area, said plurality of door components being selected from the group consisting of electrical controls, a wiring harness, a speaker, and an inside handle assembly.

23. The module as in claim 16, wherein said first panel is formed from steel or steel alloys.

* * * * *